Dec. 30, 1958     R. A. STAMPFL     2,866,896
PULSE CONVERTING CIRCUIT
Filed Jan. 2, 1957
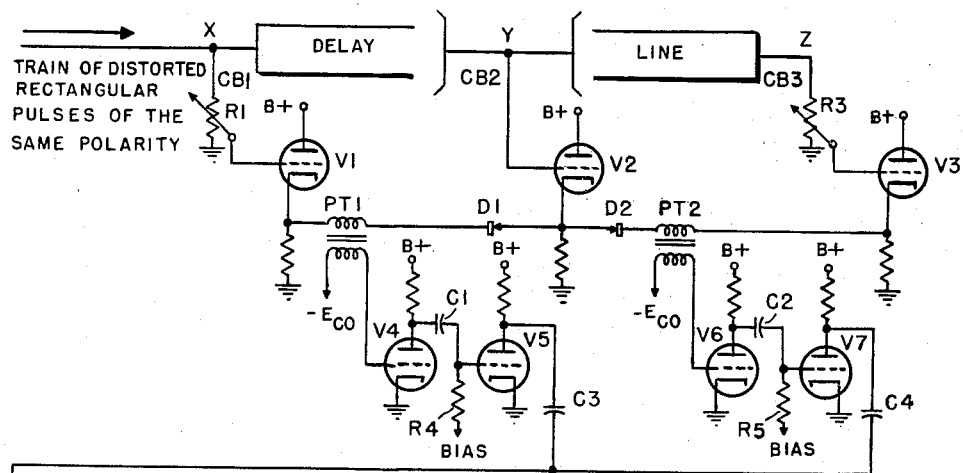
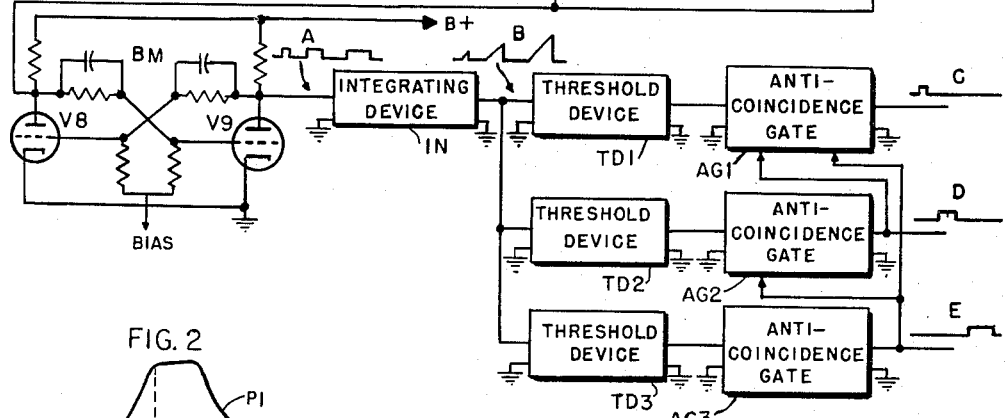
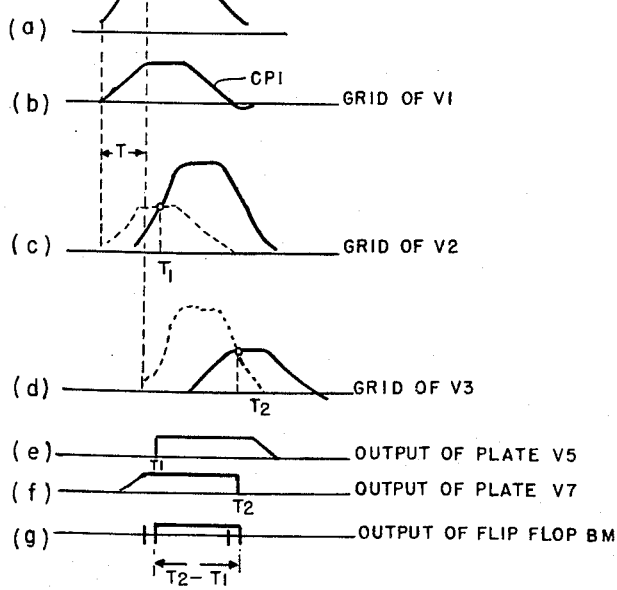
INVENTOR.
RUDOLF A. STAMPFL
BY
Harry M. Saragovitz
ATTORNEY United States Patent Office 2,866,896
Patented Dec. 30, 1958

2,866,896

PULSE CONVERTING CIRCUIT

Rudolf A. Stampfl, Asbury Park, N. J., assignor to the United States of America as represented by the Secretary of the Army Application January 2, 1957, Serial No. 632,251

5 Claims. (Cl. 250—27)

(Granted under Title 35, U. S. Code (1952), sec. 266)

The invention described herein may be manufactured and used by or for the Government for governmental purposes, without the payment of any royalty thereon.

The invention relates to electric pulse converting or reshaping circuits, and particularly to circuits for converting or reshaping electric pulses which have been distorted during transmission, to a form which will facilitate the accurate measurement of pulse width and the separation of the pulses from each other.

The transmission of electric pulses of essentially the same shape, for example, of rectangular shape, over a system of limited bandwidth may result in substantial distortion in these pulses. In particular, this distortion may take the form of broadening and sloping of the sides of each pulse. In the case of distorted rectangular pulses, the rise time of the leading and trailing edges of each pulse is no longer ideally short. The width of a pulse having a finite rise time at these edges is conventionally measured at half the peak amplitude. In the case of a train of received distorted pulses of various widths but of equal amplitudes, well known techniques are available for the measurement of the widths of the individual pulses involving, for example, the introduction of a fixed threshold to enable the separation of these pulses.

A general object of the invention is to facilitate the separation and/or accurate measurement of the width of the individual pulses in a received train of distorted electric pulses in which both the width and amplitude vary among the pulses.

A more specific object is to reshape the individual pulses in a received train of distorted electric pulses originally having substantially the same general shape but varying both in width and amplitude among the pulses, so as to establish a definite time of start and stop of each pulse which is independent of the pulse amplitude, thereby allowing these pulses to be easily separated and their widths to be accurately measured.

The above objects are attained in accordance with the invention by the use of a circuit arrangement for automatically reshaping each of the received distorted electric pulses so as to enable the pulse widths to be measured at an arbitrary percentage of the peak amplitude. It will operate satisfactorily for variations in amplitude among the pulses as great as the dynamic range of the system over which they are transmitted. However, it requires that the pulses have substantially the same shape originally, that is, prior to the introduction of distortion therein produced, for example, because of the limited bandwidth of the transmission system over which the pulses have been transmitted. This means that all pulses must have approximately the same rise time independent of their width, but not a fixed percentage of their width. This, in general, is the case if a series of rectangular pulses of the same polarity is fed through a system of a certain bandwidth, such as an antenna.

In one specific embodiment, the circuit arrangement of the invention utilizes as its principal element a delay line on which is impressed a train of distorted electric pulses originally of rectangular shape, varying both in width and amplitude among the pulses, the widths of which are to be measured. Separate circuits respectively connected across the input, the mid-point and the output of the delay line are provided to divert different energy portions of each of the received pulses at these points. Suitable means are provided in the inputs of the pulse diverting circuits at the input and output of the delay line to convert each of the pulse portions diverted therein to a different form in which the width remains the same but the amplitude is reduced to the same predetermined fraction, say, one-half, of the peak amplitude of the diverted pulse portion. Two suitably poled rectifying devices respectively connected between the same selected point in the pulse diverting circuit at the mid-point of the delay line and a corresponding point in the pulse diverting circuit at the input and the output, respectively, of the delay line, provide means for enabling the voltages produced at these points by the pulse portions of normal and reduced amplitudes to be continuously compared. The rectifying devices will be rendered conductive to cause the generation of two positive pulses in response to each of the delayed pulse portions of normal amplitude entering the pulse diverting circuit at the mid-point of the delay line. One of these generated pulses will have a substantially vertical leading edge occurring at a definite time $T_1$ when the diverted pulse portion first causes the voltage at the selected point in the line mid-point pulse diverting circuit to become larger than that simultaneously produced at the corresponding point in the diverting circuit at the input of the delay line by the pulse energy of reduced amplitude in that circuit. The other of these generated pulses will have a substantially vertical trailing edge occurring at a subsequent time $T_2$ when the voltage at the selected point in the line mid-point diverting circuit is slightly larger than that simultaneously produced at the corresponding point in the pulse diverting circuit at the output of the delay line by a further delayed pulse portion of reduced amplitude therein.

Each set of two pulses so generated, after separate amplification and clipping of the tops thereof in conventional vacuum tube amplifying and clipping circuits, may be combined in conventional manner in a bistable multivibrator or other "flip-flop" circuit to produce a single substantially rectangular pulse of a width $T_2-T_1$, which is independent of the amplitude of the original pulse and constitutes the width at a predetermined fraction of the peak amplitude of the original pulse. The rectangular pulses so produced may be separated from each other and their widths measured by conventional means.

The various objects and features of the invention will be better understood from the following complete description thereof when read in conjunction with the accompanying drawing in which:

Fig. 1 shows schematically a circuit arrangement of one embodiment of the invention; and Fig. 2 shows graphically the wave forms of and phase relationships between the transmitted electric pulses at different points in the circuit of Fig. 1, to be used in connection with an explanation of the operation of that circuit.

It will be assumed that a train of rectangular shaped electric pulses of the same polarity varying both in amplitude and width among the pulses are received over a line or other transmission medium of limited bandwith so as to be subjected to distortion therein, and are impressed on the input of the pulse converting or reshaping circuit of the invention shown in Fig. 1.

Line (a) of Fig. 2 shows one of the pulses in this train, to be referred to hereinafter as pulse P1. It will be noted that the leading and trailing edges of this pulse are sloped as shown due to the distortion introduced in the transmission system over which it has been transmitted. Line (b) of Fig. 2 shows this same pulse converted to another form in which the width remains the same but the pulse amplitude is reduced to half that of the original pulse. The pulse in line (b) will be referred to hereinafter as converted pulse CP1. If desired, the amplitude of this converted pulse may be made any other fraction of the peak amplitude of the original pulse, say ⅓, ⅔, etc., the particular fractional ratio selected determining the amplitude at which the widths of the received pulses are to be measured. Line (c) of Fig. 2 shows in the solid line curve the original pulse P1 delayed by a time interval T and in the dotted line curve a converted pulse CP1 undelayed. By reference to line (c), it will be seen that at the time $T_1$, the amplitude or voltage of the delayed original pulse P1 is equal to the peak amplitude or voltage of the converted, undelayed pulse CP1, and subsequently for a given time the voltage of P1 exceeds that of CP1. Line (d) of Fig. 2 shows that at a later time $T_2$, the amplitude or voltage of the delayed original pulse P1 is again equal to the peak amplitude or voltage of the converted pulse CP1 and subsequently is reduced below that of the peak amplitude of CP1.

The circuit arrangement of Fig. 1 is provided for establishing a definite time of start and stop, independent of amplitude, for each of the received pulses so as to enable their separation and accurate measurement. It includes a delay line so designated in the figure on the input of which the train of received distorted rectangular pulses is impressed. The delay line may be of any type, for example, a network comprising a number of recurrent sections each including a series inductance and a shunt capacitance, suitable for providing the desired amount of delay in the pulses. Three circuit branches CB1, CB2 and CB3 are provided for respectively diverting different energy portions of the received pulses from the delay line at various points in the system. The branch CB1 includes a potentiometer R1 in its input and a three-electrode cathode follower space discharge tube V1 having its control grid-cathode circuit connected through the potentiometer R1 across the input of the delay line at the point X. The circuit branch CB2 includes a second cathode follower tube V2 having its control grid-cathode circuit connected directly across the mid-point of the delay line at Y. The circuit branch CB3 includes the input potentiometer R3 and the cathode follower tube V3 having its control grid-cathode circuit connected across the output of the delay line at the point Z through the potentiometer R3. The cathode circuits of the tubes V1 and V2 are connected to each other through a circuit including the diode rectifier D1, poled as shown, and the primary winding of pulse transformer PT1 in series. Similarly, the cathode circuits of the tubes V2 and V3 are connected to each other through the diode rectifier D2, poled as shown, and the primary winding of pulse transformer PT2 in series.

The secondary winding of the transformer PT1 is connected across the control grid-cathode circuit of the amplifying vacuum tube V4, and the anode-cathode circuit of the amplifier tube V4 is connected through the coupling circuit comprising the series capacitor C1 and the shunt resistor R4 to the control grid-cathode circuit of the "clipper" vacuum tube V5. Similarly, the secondary winding of the pulse transformer PT2 is connected across the control grid-cathode circuit of the amplifying vacuum tube V6, and the anode-cathode circuit of the amplifying tube V6 is connected through the coupling circuit comprising the series capacitor C2 and the shunt resistor R5 to the control grid-cathode circuit of the "clipper" vacuum tube V7.

The anodes of the clipper vacuum tubes V5 and V7 are respectively connected through the individual capacitors C3 and C4 of equal value to a common point in the anode-cathode circuit of the vacuum tube V8 which, with the vacuum tube V9, forms a well-known plate-to-grid coupled bistable multi-vibrator or flip-flop circuit. The output of the flip-flop circuit BM is connected to a known type of pulse separating circuit consisting of an integrating device IN followed by a plurality of parallel-connected threshold device $TD_1$, $TD_2$, $TD_3$ . . . , each followed by an anti-coincidence gating device $AG_1$, $AG_2$, $AG_3$ . . . , interacting with each other in the manner to be described later.

The operation of the circuit of Fig. 1 will now be described with reference to the curves of Fig. 1.

One energy portion of each of the received distorted rectangular pulses of the same polarity, such as shown in line (a) of Fig. 2, in the pulse train applied to the input circuit in Fig. 1 will be diverted at the point X in the input of the delay line into the circuit branch CB1. The potentiometer R1 in the input of the branch CB1 is so adjusted that the peak amplitude of each of the diverted pulse portions when applied to the grid circuit of the cathode follower V1 is half that of the peak amplitude of the original pulse, as shown in line (b) of Fig. 2, or any other desired fraction of the amplitude of the original pulse. The other energy portion of each received pulse will pass over the delay line towards the branch circuits CB2 and CB3. At the mid-point Y of the delay line, a portion of each pulse which has been delayed in that line by a time interval T (see line (c) of Fig. 2) will be diverted into the circuit branch CB2 and will be fed directly to the grid circuit of the cathode follower V2 in that branch. When the voltage at the cathode of V2 due to a delayed pulse applied to the grid of that tube is greater than the voltage simultaneously present at the cathode of the cathode follower V1 in response to a converted pulse applied to its grid, the diode D1 will conduct and a positive current pulse will flow through the primary winding of the pulse transformer PT1. The amplifier tube V4 is normally biased to cut-off by the negative voltage $-E_{CO}$ applied to its grid through the secondary winding of transformer PT1. The positive pulse applied through the transformer PT1 to the grid of V4 will drive that grid positive so that this pulse will be amplified by that tube and then will be applied through the capacitor C1 to the grid circuit of the tube V5. The tube V5 is normally biased within its conduction region by the biasing voltage applied to its grid through the resistor R4, and, therefore, will clip the top of the applied pulse. The output of the tube V5, as shown in line (e) of Fig. 2, is a nearly rectangular pulse having a substantially vertical leading edge initiated at a time $T_1$, and of an amplitude, independent of the amplitude of the received pulse, which is determined only by the bias of the tube V5.

Another energy portion of each pulse transmitted over the line and delayed therein for a time interval 2T will be diverted into the circuit branch CB3 at the point Z in the output of the delay line. This diverted pulse will be adjusted by potentiometer R3 to the proper amplitude (one-half, one-third, etc.) of its peak amplitude and then fed to the grid of the cathode follower V3. When the voltage at the cathode of tube V3 due to the delayed pulse of reduced amplitude applied to its grid is lower than that of the voltage simultaneously present at the cathode of the tube V2 in circuit branch CB2 due to the delayed pulse of greater amplitude applied to the grid of the latter tube, the diode D2 will conduct and a positive current impulse will flow through the primary winding of the pulse transformer PT2. The amplifier V6 is normally biased to cut-off by the negative voltage $-E_{CO}$ applied to its grid through the secondary winding of transformer PT2. The positive pulse applied to the grid of tube V6 through the transformer PT2 will be amplified by that tube, and then will be applied through the capacitor C2 to the grid circuit of the clipper tube V7. The tube V7 is biased within its conduction region by the biasing voltage applied to its grid through the resistor R5 and, therefore, will clip the top of the applied pulse. The output of the tube V7, as shown in line (f) of Fig. 2, is a nearly rectangular pulse having a substantially vertical trailing edge occurring at a definite time $T_2$ which is independent of the amplitude of the received pulse.

The output pulses from the tubes V5 and V7 will be differentiated by the capacitors C3 and C4 to provide spikes for triggering the bistable multivibrator BM, the time positions of which are respectively indicated by the two vertical marks in line (g) of Fig. 2. The leading edge of the output pulse from V5 and the trailing edge of the output pulse from V7 will cause operation of the multivibrator BM in the conventional manner to produce a single output pulse of a width equal to $T_2-T_1$, independent of the received pulse amplitude, as shown in line (g) of Fig. 2, constituting the pulse width at a predetermined fraction of the peak amplitude of the original received pulse.

The separation of the pulses of various widths in the pulse train so produced in the output of the bistable multivibrator BM or other flip-flop circuit, as shown in the curve A in the output of that circuit in the figure, can be achieved as shown in Fig. 1 by first feeding this pulse train through a conventional integrating device IN, which may be a resistance-capacitance network, to convert the pulses in the pulse train to the peaked form shown in the curve B at that point; and then applying the converted pulse train to a conventional threshold-type pulse separating circuit. This circuit, for example, as shown may comprise a number of parallel-connected conventional threshold devices $TD_1$, $TD_2$, $TD_3$ . . . with different fixed thresholds, each consisting, say, of one or more diodes and a monostable multivibrator, and each followed by a different one of the conventional anti-coincidence gating devices in the group $AG_1$, $AG_2$, $AG_3$ . . ., which may be differently biased pentodes, each threshold device with its associated gating device operating to produce in the output of the latter the pulses of a different one of the several widths, as shown by pulse output C, D and E, respectively, in the pulse train applied to its input while preventing transmission of the pulses of other widths applied to the inputs of the several threshold devices.

Various modifications of the circuits illustrated and described which are within the spirit and scope of the invention will occur to persons skilled in the art.

What is claimed is:

1. Apparatus for reshaping a received train of distorted electric pulses of the same polarity and general shape but varying in width and amplitude among the pulses, to establish a definite time of start and stop for each pulse which is independent of the pulse amplitude and facilitates separation and accurate measurement of the width of each of the pulses: said apparatus including a delay line on which said train of pulses is impressed for transmission thereover; one circuit connected across the input of said line for diverting one energy portion of each of said pulses therefrom; a second circuit connected across the mid-point of said line for diverting a second energy portion of each of said pulses therefrom; a third circuit connected across the output of said line for diverting a third energy portion of each of said pulses therefrom; means in the input of said one and said third circuit for respectively converting each diverted pulse portion therein to a different form in which the pulse width remains the same but the amplitude is reduced to the same predetermined fraction of the peak amplitude of that diverted pulse portion; means responsive to a larger voltage produced at one point in said second circuit by each diverted pulse portion therein than that simultaneously produced at a corresponding point in said one and said third circuit, respectively, by the converted pulse energy therein, to generate two voltage pulses of the same polarity and amplitude, one having a substantially vertical leading edge initiated at a time $T_1$ and the second having a substantially vertical trailing edge occurring at a subsequent time $T_2$; and means responsive to the leading edge of said one pulse and the trailing edge of said second pulse generated in response to each of the received pulses in said train, for generating a single, substantially rectangular pulse of a width, $T_2-T_1$, independent of the received pulse amplitude, and constituting the pulse width at said predetermined fraction of the peak amplitude of that received pulse.

2. The pulse reshaping apparatus of claim 1, in which said voltage responsive means includes two rectifying devices respectively connected between said one point in said second circuit and the corresponding point in said one and said third circuit, respectively, which rectifying devices are poled in the same direction with respect to said one point in said second circuit and are adapted to conduct so as to produce in their respective outputs connected to the corresponding points in said one and said third circuit, respectively said one and said second pulse when the voltage differences between these respective points and said one point exceed a given value.

3. The pulse reshaping apparatus of claim 1, in which the pulse form converting means in said one and said third circuit comprises an input potentiometer; each said one, said second and said third diverting circuit includes a cathode follower discharge tube having a cathode; the cathode follower discharge tube in said one and said third circuit is connected through the input potentiometer across the input and output, respectively, of said delay line; said voltage responsive means includes two rectifying devices respectively connected between the cathode of the cathode follower tube in said second circuit and the cathode of the cathode follower tube in said one and said third circuits, respectively; said rectifying devices being poled in the same direction with respect to the cathode of the cathode follower tube in said second circuit and being adapted to conduct to produce in their respective outputs said one and said second current pulses, respectively, when the voltage difference between said one point in said second circuit and the corresponding point in said one or said third circuit exceeds given values; and said means for generating a single, substantially rectangular pulse of a width independent of the received pulse amplitude comprises two equal capacitors and a bistable multivibrator adapted to be triggered through said capacitors at desired times in response to the leading edge and trailing edge of said one and said second current pulse, respectively, generated in response to each of the received pulses in said train.

4. The pulse reshaping apparatus of claim 1, in which the pulse form converting means in said one and said third diverting circuit, respectively, comprises a properly adjusted input potentiometer; each said one, said second and said third diverting circuit includes a cathode follower discharge tube having a cathode; said voltage responsive means comprises two rectifying devices respectively connected between the cathode of the cathode follower tube in said second diverting circuit and the cathode of the cathode follower tube in said one and said third diverting circuit, respectively, said rectifying devices being poled in the same direction with respect to the cathode of the cathode follower tube in said second circuit and being ducing the peak amplitudes of said one and said second voltage pulse when the voltage produced at the cathode of the cathode follower tube in said second circuit exceeds that produced at the cathode of the cathode follower tube in said one and said third diverting circuit, respectively, and vacuum tube amplifying and clipping means for reducing the peak amplitude of said one and said second voltage pulses produced in response to each received pulse to the same value; and said means responsive to each of the received pulses in said train for generating a single, substantially rectangular pulse of a width independent of the received pulse amplitude and constituting the pulse width at said predetermined fraction of the peak pulse amplitude, includes a bistable multivibrator adapted to be triggered in response to the leading edge of said one and the trailing edge of said second pulse.

5. The pulse reshaping apparatus of claim 1, in which an individual cathode follower tube having a cathode, is included in said one, said second and said third circuit, respectively; each said voltage responsive device includes an individual rectifying device and an individual pulse transformer connected in series between the cathode of the cathode follower tube in said one and said second circuit, respectively, and between the cathodes of the cathode follower tubes in said second and said third circuits, respectively, said rectifying devices being respectively adapted to conduct in response to each of the pulses of normal amplitude diverted into said second circuit when the voltage produced thereby at the cathode of the cathode follower tube in that circuit is higher than that simultaneously produced at the cathode of the cathode follower tube in said one or said third circuit, respectively, by the converted pulses of reduced amplitude therein, so as to generate said one and said second pulse in the associated pulse transformers, and vacuum tube means connected to each of said transformers is provided for amplifying and clipping the tops of the pulses generated therein before supplying them to said pulse responsive means.

References Cited in the file of this patent
UNITED STATES PATENTS

| | | |
|---|---|---|
| 2,403,561 | Smith | July 9, 1946 |
| 2,670,463 | Raymond et al. | Feb. 23, 1954 |
| 2,794,123 | Younker | May 28, 1957 |
| 2,800,584 | Blake | July 23, 1957 |

UNITED STATES PATENT OFFICE
CERTIFICATE OF CORRECTION

December 30, 1958

Patent No. 2,866,896

Rudolf A. Stampfl

It is hereby certified that error appears in the printed specification of the above numbered patent requiring correction and that the said Letters Patent should read as corrected below.

Column 6, line 62, after "being" insert — adapted to conduct to generate said one and said second voltage pulse when the voltage produced at the cathode of the cathode follower tube in said second circuit exceeds that produced at the cathode of the cathode follower tube in said one and said third diverting circuit, respectively, and vacuum tube amplifying and clipping means for re- —.

Signed and sealed this 7th day of July 1959.

(SEAL)
Attest:
KARL H. AXLINE
Attesting Officer

ROBERT C. WATSON
Commissioner of Patents